US008590050B2

(12) United States Patent
Nagpal et al.

(10) Patent No.: US 8,590,050 B2
(45) Date of Patent: Nov. 19, 2013

(54) SECURITY COMPLIANT DATA STORAGE MANAGEMENT

(75) Inventors: Abhinay Ravinder Nagpal, Pune (IN);
Sri Ramanathan, Lutz, FL (US);
Sandeep Ramesh Patil, Elmsford, NY (US); Matthew Bunkley Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 13/105,283

(22) Filed: May 11, 2011

(65) Prior Publication Data

US 2012/0291133 A1 Nov. 15, 2012

(51) Int. Cl.
*H04L 9/00* (2006.01)

(52) U.S. Cl.
USPC ............ 726/26; 726/27; 726/28; 726/29; 726/30; 713/164; 713/165; 713/166; 713/167

(58) Field of Classification Search
USPC ........................................... 726/26
See application file for complete search history.

(56) References Cited

U.S. PATENT DOCUMENTS

| | | | |
|---|---|---|---|
| 5,479,638 A | 12/1995 | Assar et al. | |
| 6,009,537 A | 12/1999 | Tanimoto et al. | |
| 6,973,553 B1 | 12/2005 | Archibald, Jr. et al. | |
| 7,133,231 B2 | 11/2006 | Yun et al. | |
| 7,177,979 B2 | 2/2007 | Kuwamura | |
| 7,197,433 B2 | 3/2007 | Patel et al. | |
| 7,373,268 B1 | 5/2008 | Viredaz et al. | |
| 7,447,920 B2 | 11/2008 | Sharma et al. | |
| 7,739,577 B2 * | 6/2010 | Earhart et al. | 714/763 |
| 7,864,476 B2 | 1/2011 | Ehrlich | |
| 2002/0029251 A1 | 3/2002 | Ogino et al. | |
| 2006/0112286 A1 | 5/2006 | Whalley et al. | |
| 2007/0180207 A1 | 8/2007 | Garfinkle | |
| 2008/0234873 A1 | 9/2008 | Gorbatov et al. | |
| 2009/0049236 A1 * | 2/2009 | Kinoshita | 711/112 |
| 2009/0244775 A1 | 10/2009 | Ehrlich | |

FOREIGN PATENT DOCUMENTS

| | | | |
|---|---|---|---|
| JP | 2001093220 A | 4/2001 | |
| JP | 2006294231 A | 10/2006 | |

OTHER PUBLICATIONS

American Health Information Management Association (AHIMA). "Destruction of Patient Health Information (Updated)." Journal of AHIMA. Nov. 2002. <http://library.ahima.org/xpedio/groups/public/documents/ahima/bok1_016468.hcsp?dDocName=bok1_016468>.
Kabay, M. E. Network World. "Disk Data Remanence: Part 2—Inside the Digital Shredder." Aug. 7, 2007 <http://www.networkworld.com/newsletters/sec/2007/0806sec1.html>.

(Continued)

*Primary Examiner* — Longbit Chai
(74) *Attorney, Agent, or Firm* — Jinesh P. Patel; Jason H. Sosa; Matthew Chung

(57) ABSTRACT

An embodiment of the invention is a program for dynamically managing files to comply with security requirements. In one embodiment, changing security requirements require that the computer system identifies the current storage locations of files along with the files' respective security levels. Files containing changed security levels due to the changed security requirements are relocated to storage locations clustered with storage locations containing files of the same security level. In another embodiment, the computer system receives a file having a certain security level, identifies current storage locations of files with the files' respective security levels, and finally allocates the new file to a storage location clustered with storage locations containing files of the same security level.

21 Claims, 6 Drawing Sheets

(56) References Cited

OTHER PUBLICATIONS

Thompson, Bill. BCC News. "Storm Warning for Cloud Computing." Published May 27, 2008. <http://news.bbc.co.uk/go/pr/fr/-/2/hi/technology/7421099.stm>.

Tang, Yuhui et al. "Understanding Adjacent Track Erasure in Discrete Track Media." IEEE Transactions on Magnetics. Sep. 2008. <http://www.dssc.ece.cmu.edu/research/pdfs/2_DSSC_Samsung_DTRModeling.pdf>.

Karabuto, Alex. XBT Labs. "HDD Diet: Power Consumption and Heat Dissipation." Jul. 11, 2005. <http://ixbtlabs.com/articles2/storage/hddpower.html>.

Karabuto, Alex. XBT Labs. "HDD Diet 2: Power Consumption and Heat Dissipation of Enterprise Hard Disk Drives." Mar. 2, 2006. <http://ixbtlabs.com/articles2/storage/hddpower-pro.html>.

HP. "HP Announces "Smart" Cooling Solution for Data Centers." Mar. 4, 2003 <http://www.hp.com/hpinfo/newsroom/press/2003/030304b.html>.

Weston, Rusty. "Greening the Data Center." United Business Media LLC. 2011. Date printed May 10, 2011 <http://www.smartenterprisemag.com/articles/2008winter/markettrends2.jhtml>.

Rosenberg, Dave. "IBM Takes to Amazon's EC2 Cloud." CNET News. Feb. 11, 2009 <http://news.cnet.com/8301-13846_3-10161864-62.html>.

The Engineering Toolbox. "Fans—Efficiency and Power Consumption." Date printed May 10, 2011 <http://www.engineeringtoolbox.com/fans-efficiency-power-consumption-d_197.html>.

Wikipedia. "Self Organizing Map." Page last modified on Feb. 14, 2011. Date printed Feb. 15, 2011 <http://en.wikipedia.org/wiki/Self-organizing_map>.

Stadtmueller, Lynda. "Beyond the Platform: Choosing the Right SaaS Delivery Partner." Stratecast, Division of Front & Sullivan. Jun. 2010. <https://www-304.ibm.com/connections/blogs/fa3a3fd5-6d7b-48b9-b13b-ba25f3325dda/resource/BeyondthePlatform-ChoosingtheRightSaaSDeliveryPartner.pdf?lang=en_us>.

IBM. "Space Allocation on Direct Access Storage Device." IPCOM 000054724D. Original Publication Date: Mar. 1, 1980. IP.com Electronic Publication: Feb. 13, 2005.

IBM. "Dynamic Thermal Mapping and Trend Analysis As a Control Mechanism for HVAC Systems in Data Centers." IPCOM 000135036D. Mar. 27, 2006.

IBM. "Energy Efficient Cooling for Data Center." IPCOM 000182040D. Apr. 23, 2009.

Kissel, Richard et al. "Guidelines for Media Sanitization, Recommendations of the National Institute of Standards and Technology." NIST Special Publication 800-88. Sep. 2006. <http://csrc.nist.gov/publications/nistpubs/800-88/NISTSP800-88_rev1.pdf>.

\* cited by examiner

|||||||||| = ADJACENT BLOCKS
XXXXX = HIGH REMANENCE BLOCKS

SECURITY COMPLIANT DATA STORAGE MANAGEMENT

BACKGROUND

This disclosure relates generally to data storage management and more specifically to allocating and organizing data based on varying data security requirements.

The cloud computing environment is an enhancement to the predecessor grid environment, whereby multiple grids and other computation resources may be further abstracted by a cloud layer, thus making disparate devices appear to an end-user/consumer as a single pool of seamless resources that are highly scalable. These resources may include such things as physical or logical compute engines, servers and devices, device memory, storage devices, etc.

The disparate devices of a cloud computing environment may actually be physically separated by great distances. A computing environment which spans multiple geographies may find itself subject to data security standards from these different locations. Further, such a computing environment may be accessed by clients from around the globe. Similarly, clients from different geographies may require that data belonging to them meet with their geographies' data security standards. The same may hold true for clients of cloud computing environment who themselves have clients from around the globe.

In addition, the rise of mobile computing devices also increases the occurrence of single computing devices crossing these same geographic boundaries. In certain instances, a computing device meeting certain data security standards may find itself to be out of compliance as the computing device travels from one geography to the next.

SUMMARY

In one embodiment of the invention, a method, computer program product, and system is disclosed for dynamically managing a first and a second plurality of files having first and second security levels, respectively, to comply with changing security requirements. A computer system, responsive to a change in classification of a file of the first plurality from the first security level to the second security level, identifies current physical storage locations of the first and second pluralities of files and respective current security levels for respective files of the first and second pluralities of files. The computer system relocates the file of the first plurality of files from a current physical storage location, which was not clustered with the physical storage locations of the second plurality of files, to another physical storage location which is clustered with the physical storage locations of the second plurality of files.

In another embodiment of the invention, a method, computer program product, and system is disclosed for dynamically managing a first and a second plurality of files having first and second security levels, respectively, and an additional file having the first security level, to comply with security requirements. A computer system, responsive to receipt of the additional file having the first security level, identifies current physical storage locations of the first and second pluralities of files and respective current security levels for respective files of the first and second pluralities of files, the first plurality of files being stored in physical storage locations of a first cluster based on the first security level, and the second plurality of files being stored in other physical storage locations in a second cluster based on the second security level. The computer system stores the additional file in a storage location which is clustered with the first cluster.

DETAILED DESCRIPTION

Figure 1:
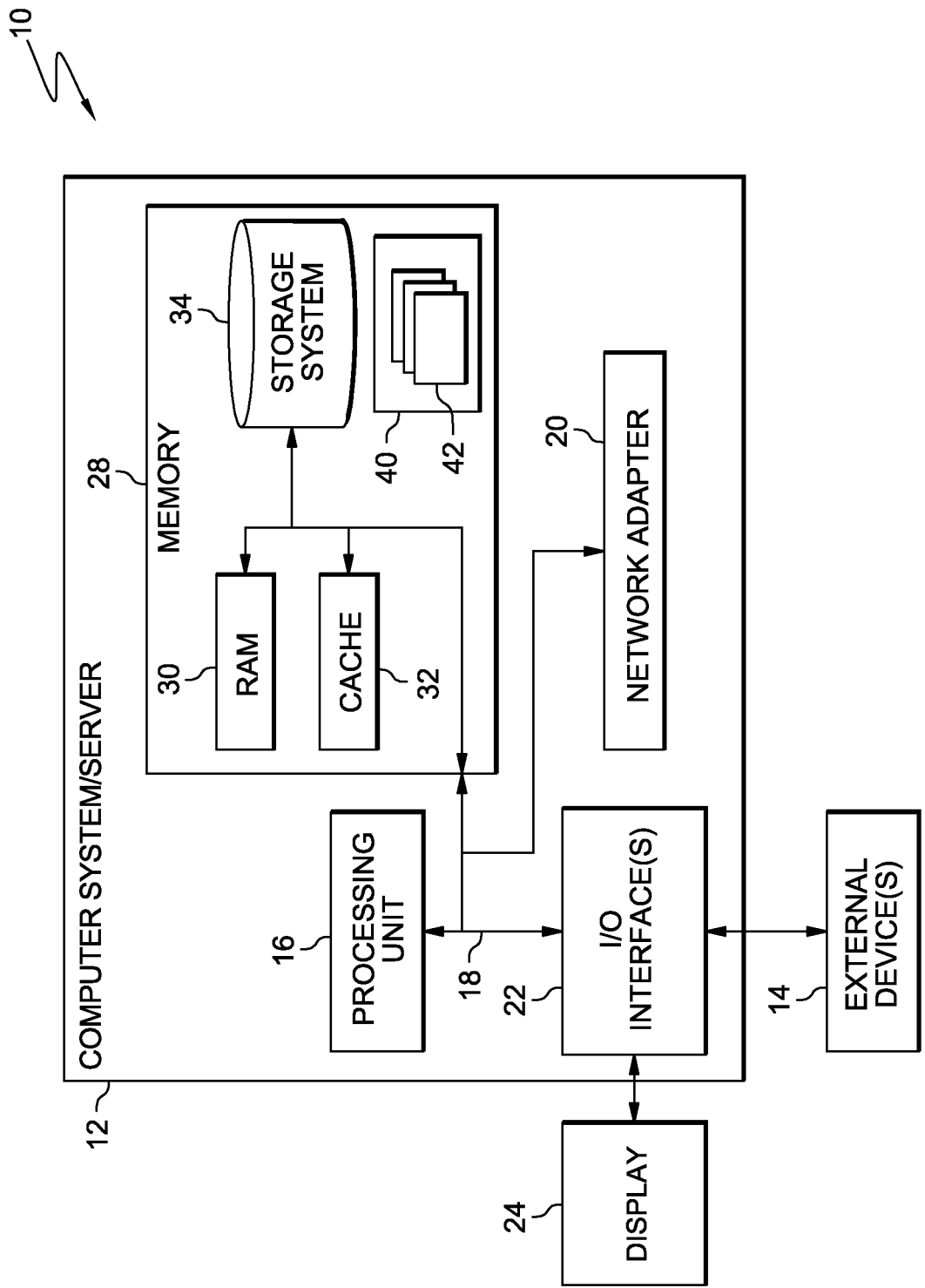
FIG. 1 depicts a networked (e.g., cloud) computing node according to an embodiment of the present invention.

Exemplary embodiments will now be described more fully herein with reference to the accompanying drawings, in which exemplary embodiments are shown. This disclosure may, however, be embodied in many different forms and should not be construed as limited to the embodiments set forth herein. Rather, these embodiments are provided so that this disclosure will be thorough and complete and fully convey the scope of this disclosure to those skilled in the art. In the description, details of well-known features and techniques may be omitted to avoid unnecessarily obscuring the presented embodiments.

Embodiments of the present invention provide an approach for allocating and organizing data in a computer system in accordance with security standards, which may be dictated in part by geographic location. A computer system comprises one or more processors, one or more computer-readable memories, one or more computer-readable tangible storage devices and program instructions which are stored on the one or more storage devices for execution by the one or more processors via the one or more memories. Such a system may encompass both a networked (e.g., cloud) storage computing environment composed of a plurality of smaller computer systems and devices, as well as a single discrete computing device, such as a laptop or Smartphone. Embodiments of the invention provide functionality for security compliant data storage management.

Specifically, the security compliant data storage management functionality provides organization and allocation of data by clustering data with similar security requirements together by identifying a security profile of a user and mapping storage locations with respect to security requirements. Moreover, the security compliant data storage management functionality provides the capability for a computer system to organize itself in the most efficient way, while still complying with security standards.

It is understood in advance that although this disclosure includes a detailed description of cloud computing, implementation of the teachings recited herein is not limited to a cloud computing environment. The cloud computing environment is a preferred environment for embodiments of the present invention because such an environment may host users from a wide range of geographical locations, requiring compliance with different data security standards. It is to be understood that embodiments of the present invention are capable of being implemented in conjunction with any other type of computing environment now known or later developed, including an environment depicted by a single mobile computing device which itself may be transported across geographical boundaries.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify a location at a higher level of abstraction (e.g., country, state, or datacenter).

Rapid elasticity: capabilities can be rapidly and elastically provisioned, in some cases automatically, to quickly scale out, and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy, onto the cloud infrastructure, consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary computer software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 (such as a keyboard, a pointing device, a display 24, etc.), one or more devices that enable a user/consumer to interact with computer system/server 12, and/or any devices (e.g., network card, modem, etc.) that enable computer system/server 12 to communicate with one or more other computing devices. Such communication can occur via I/O interfaces 22. Computer system/server 12 can also communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or computer software components could be used in conjunction with computer system/server 12. Examples include, but are not limited to: microcode, device drivers, redundant processing units, external disk drive arrays, RAID systems, tape drives, and data archival storage systems, etc.

Figure 2:
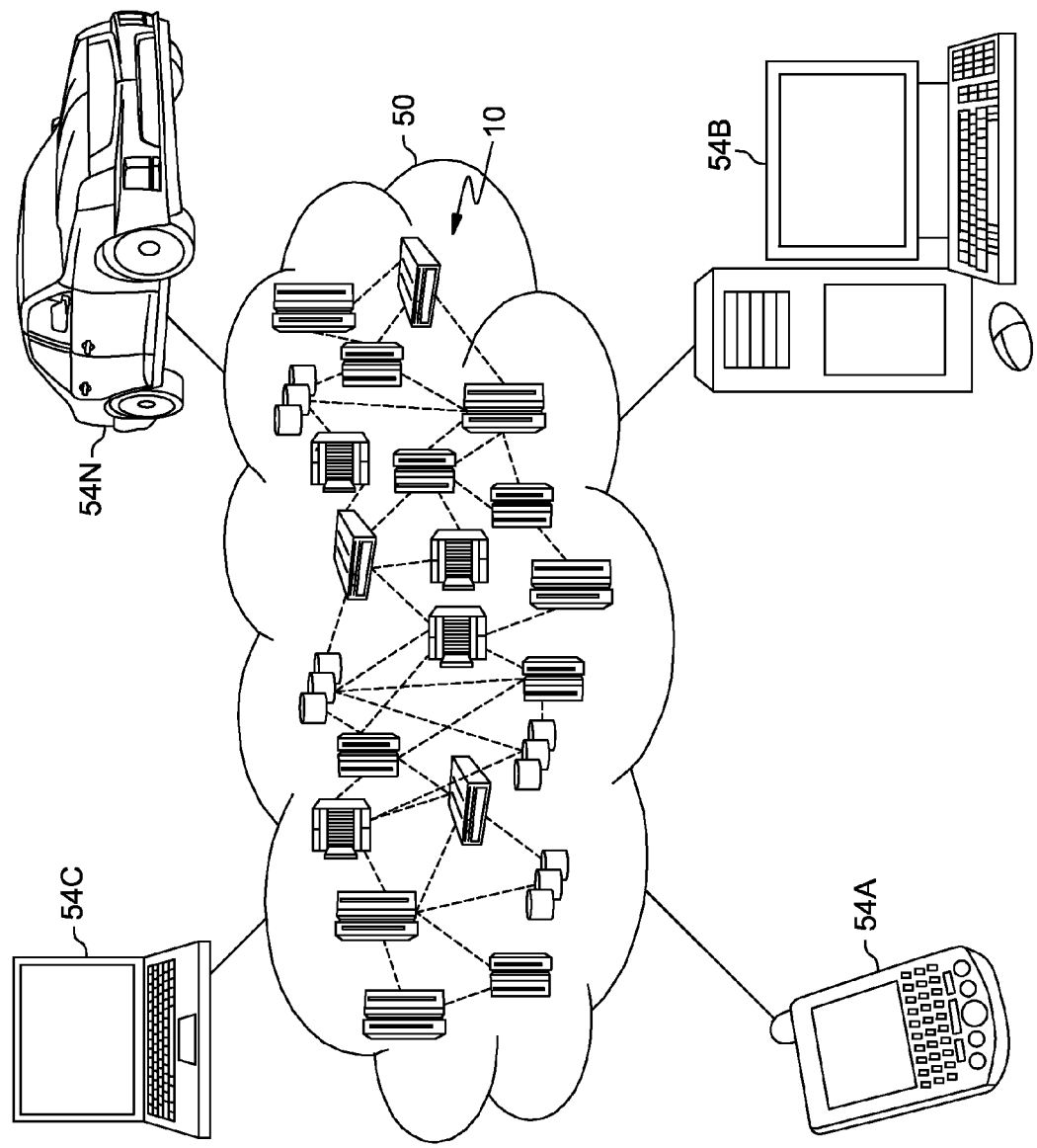
FIG. 2 illustrates a networked (e.g., cloud) computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers may communicate. Such computing devices may include, but are not limited to, personal digital assistant (PDA) or cellular telephone 54A, desktop computer 54B, laptop computer 54C, and/or automobile computer system 54N. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
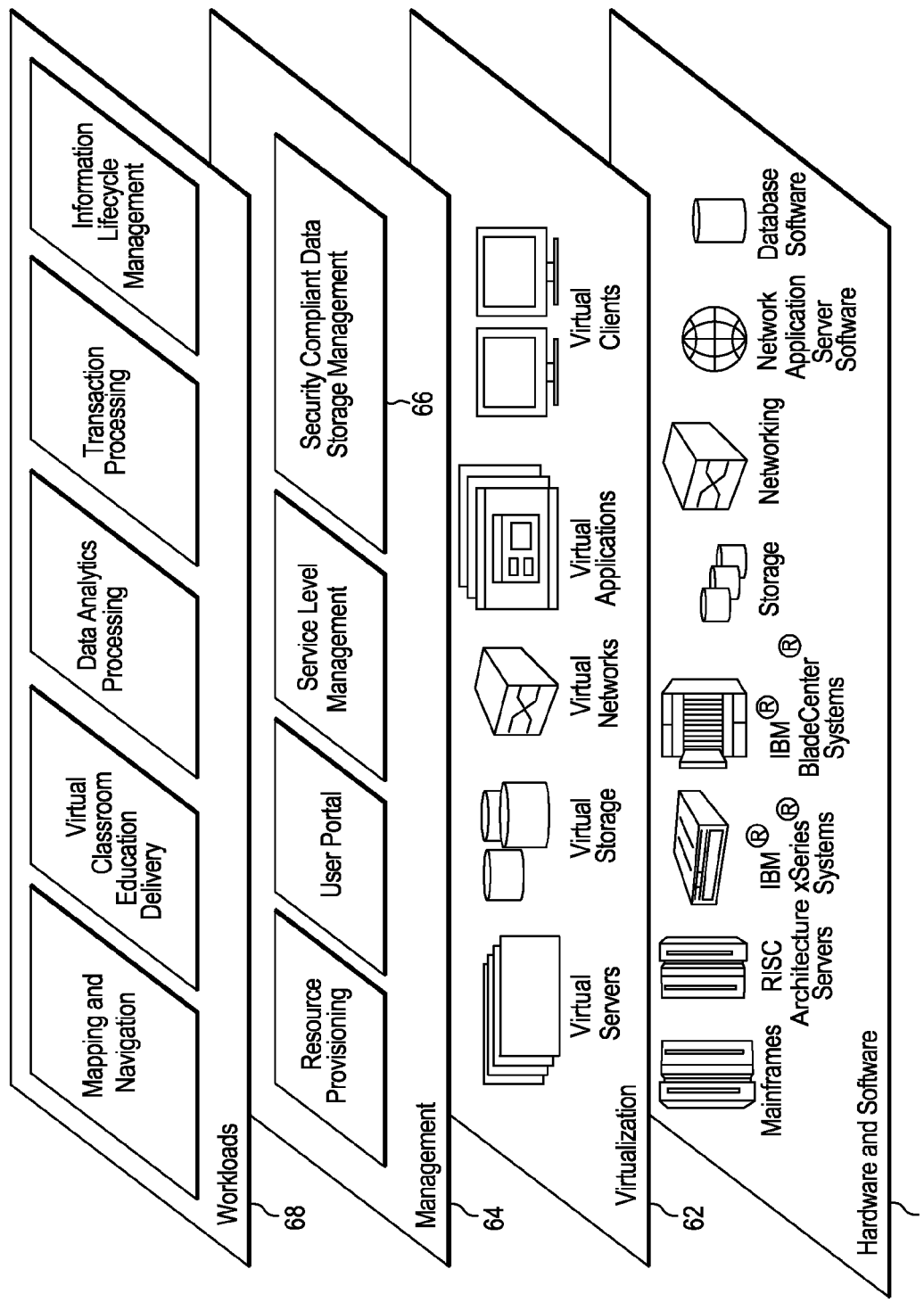
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and computer software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of computer software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

Management layer 64 provides for management of cloud services residing on servers within a cloud computing environment. In one embodiment, management layer 64 may provide the program modules and/or functionalities described below. Resource provisioning provides dynamic procurement of computing resources and other resources that are utilized to perform tasks within the cloud computing environment. User/consumer portal provides access to the cloud computing environment for consumers and system administrators. Service level management provides cloud computing resource allocation and management such that required service levels are met. Security compliant data storage management functionality 66 includes one or more program modules that allocate and organize data to storage on hardware and software layer 60 in accordance with security standards, which may be dictated in part by geographic location.

It is understood that functions of the present invention as described herein may be performed by security compliant data storage management functionality 66, which can be tangibly embodied as modules of program code 42 (shown in FIG. 1) of program/utility 40 (shown in FIG. 1) residing in the cloud management layer 64. However, this need not be the case. Rather, the functionality recited herein could be carried out/implemented and/or enabled by other layers depicted in FIG. 3, such as workloads layer 68.

Workloads layer 68 provides examples of functionality for which the cloud computing environment may be utilized. In one embodiment, workloads and functions which may be provided from this layer include: mapping and navigation; software development and lifecycle management; virtual classroom education delivery; data analytics processing; transaction processing; and information lifecycle management. As mentioned above, all of the foregoing examples described with respect to FIG. 3 are illustrative only, and the invention is not limited to these examples. In addition, workloads and applications are used synonymously.

It is reiterated that although this disclosure includes a detailed description on cloud computing, implementation of the teachings recited herein are not limited to a cloud computing environment. Rather, the embodiments of the present invention are intended to be implemented with any type of computer system, including a networked (e.g., cloud) storage computing environment now known or later developed.

Figure 4:
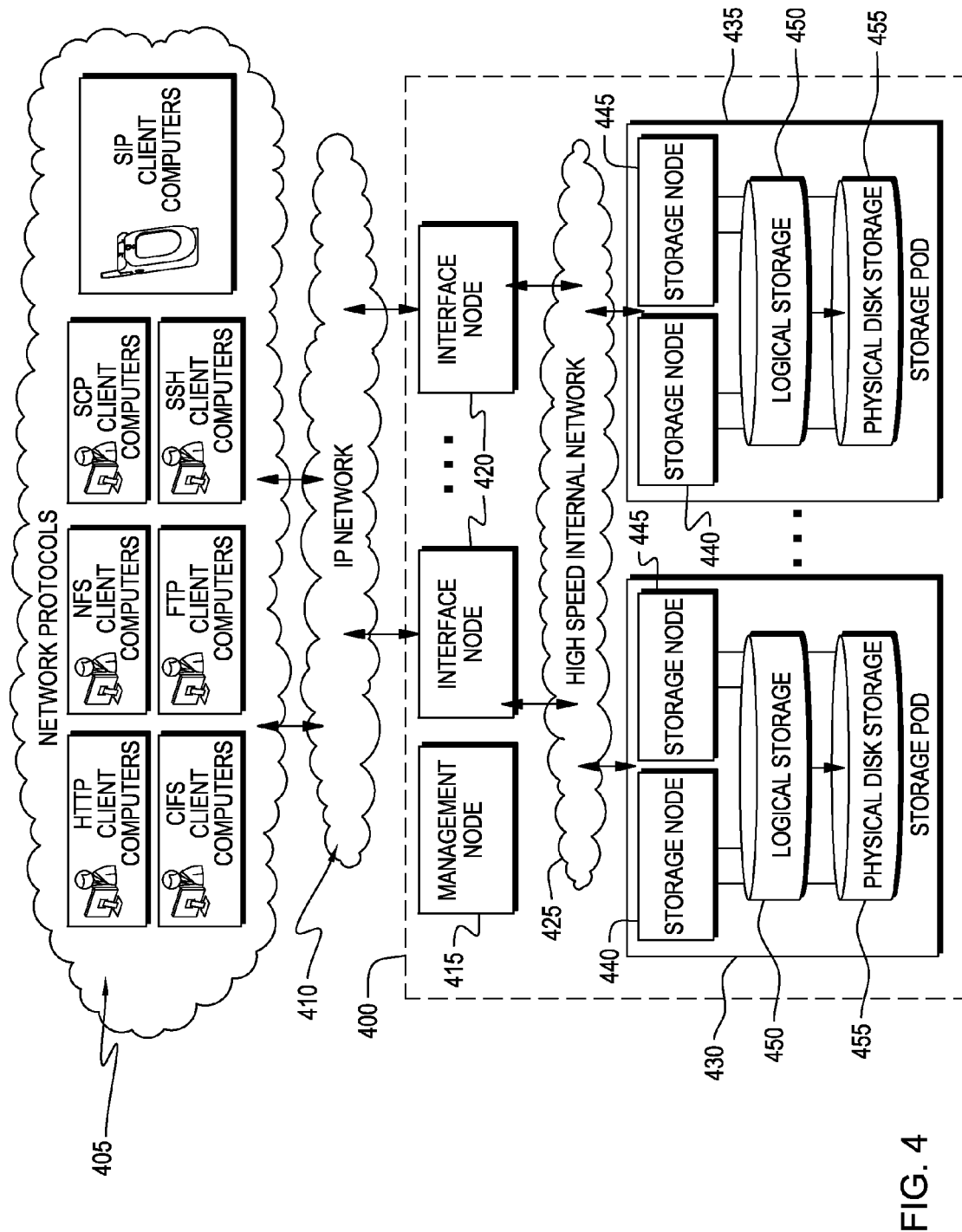
FIG. 4 illustrates a high-level architectural view of a network attached storage supporting security compliant data storage management according to an embodiment of the present invention.

Referring now to FIG. 4, network attached storage cloud infrastructure 400, offered by a networked (e.g., cloud) computing storage service provider, is depicted in accordance with an illustrative embodiment. Storage cloud infrastructure 400 maintains support for client computers utilizing standards-based network protocols 405 which may comprise, for example, Hypertext Transfer Protocol (HTTP), Network File System (NFS) Protocol, Secure Copy Protocol (SCP), Computer Internet File System (CIFS) Protocol, File Transfer Protocol (FTP), Secure Shell (SSH) Protocol, and even Session Initiation Protocol (SIP) (a signaling protocol widely used for controlling multimedia communication sessions— VoIP, live video streaming—over Internet Protocol and which is a permanent element of the IP multimedia subsystem (IMS) architecture).

Internet Protocol (IP) network 410 provides for connectivity between client computers utilizing protocols 405 and storage cloud infrastructure 400, so that a user can access files residing in, and store files to, storage cloud infrastructure 400. Management node 415 can configure, manage and monitor storage cloud infrastructure 400 through security and compliance policies and in accordance with security compliant data storage management functionality 66 of management layer 64 depicted in FIG. 3. Security and compliance policies are rules which may be implemented by computer program code in order to satisfy both a user's security requirements, preferably based on geographical standards, and clustering/grouping standards of the computer system. A user's security requirements may also be referred to as the user's security profile herein.

Furthermore, storage cloud infrastructure 400 can have one or more interface nodes 420. Interface nodes 420 provide user access to the data and file services within cloud infrastructure 400, and may utilize standard protocols 405. Within cloud infrastructure 400, storage is arranged in storage pods, such as storage pods 430 and 435, which each contain a pair of storage nodes 440 and 445, respectively. The interface nodes 420 are connected to the storage pods 430 and 435, via a high speed internal network 425. Moreover, interface node 420 and storage nodes 440 and 445 function together to provide direct access to physical storage 455 via logical storage pool 450 in respective storage pods 430 and 435. Thus, a user is given the IP address assigned to an interface node, wherein the interface node can then be utilized to directly access data within a storage pod or save data to a storage pod. Specifically, the storage pod will contain the user's data and file system configuration information, which may include the user's security profile.

Figure 5:
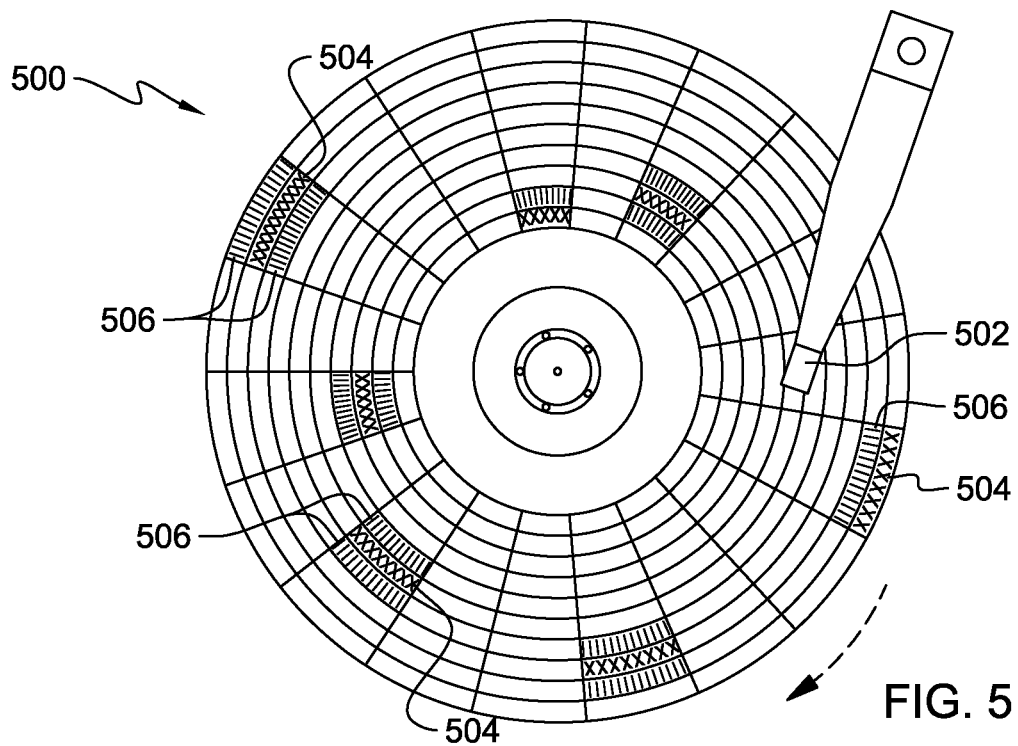
FIG. 5 depicts a hard disk drive with high remanence data blocks scattered across the drive in accordance with an illustrative embodiment.

Referring now to FIG. 5, a hard disk drive with high remanence data blocks scattered across the drive is depicted in accordance with an illustrative embodiment. Hard disk drive (HDD) 500 shows a traditional magnetic hard disk containing a multitude of tracks divided into a multitude of storage blocks. HDD 500 is an example of physical disk storage 455 in FIG. 4. Other types of physical disk storage may be used in various embodiments. Disk head 502 pivots left and right in conjunction with the direction of rotation for HDD 500 to read and write to any storage block on any track of HDD 500.

Remanence is magnetization left behind in a medium after an external magnetic field is removed. Data remanence refers to the residual representation of data that remains even after attempts have been made to remove or erase the data from storage (especially on magnetic storage). This residual data may be recovered through various restorative techniques. Therefore, erasure of sensitive information, stored as data, often must comply with certain security standards to ensure that such information is not recoverable. For example, the U.S. Department of Commerce, in conjunction with the National Institute of Standards and Technology (NIST), produced special publication 800-88 promulgating guidelines for media sanitization. Similarly, the Department of Defense (DoD) has also released their own Erasure Standard (DoD 5220.22M). Sensitive information may include anything from cell phone records, to medical records, to government classified information. In addition, many geographic regions (from country to country, and even from state to state) have different standards to be met. A storage block containing sensitive information may be referred to herein as a high remanence block. Depending on the type of sensitive information, different levels or classifications of security standards may apply, even within the same region. For example, erasure policies of a cell phone record may not be as stringent as the policies for medical records.

Though the security and compliance standards may differ from region to region, a typical implementation of a "secure delete" involves multiple passes of writing with different formats over the high remanence block or blocks. Increased number of writes requires more power and hence produces more heat.

In addition, increased writing may lead to increased adjacent track erasures (ATE), increased adjacent track interference (ATI), and increased side writing/side erasure. These are all variations of inadvertent erasure of data, and are directly correlated to the amount of writes on nearby data. While such effects can be minimized with new disk heads and hard drives with discrete tracks, the fact remains that the more one writes to a storage block, the more inadvertent erasure of nearby data occurs. To combat this, after a hard disk drive has written to a certain block or track a certain number of times, the adjacent tracks are re-written with their data to ensure that the data is not lost over time. Hence, the increased over-writing required for the proper removal of high remanence blocks also leads to the increased re-writing of adjacent tracks.

Often, data stored on a computer system is allocated to the next available open storage block(s), which may result in similar types (security levels) of data being stored sporadically across storage blocks of a hard disk drive and even across multiple physical storage locations. As shown in FIG. 5, HDD 500 contains seven high remanence blocks 504. In this particular example, HDD 500 then has twelve adjacent blocks 506 on nine different tracks, leaving at least nine tracks eligible for re-writing. However, depending on the various placement of the seven high remanence blocks 504, there could be as many as fourteen adjacent tracks that have to be re-written when high remanence data blocks 504 are erased. Again, these additional writes consume more power and produce more heat, which in turn requires more cooling, which requires more power consumption.

Figure 6:
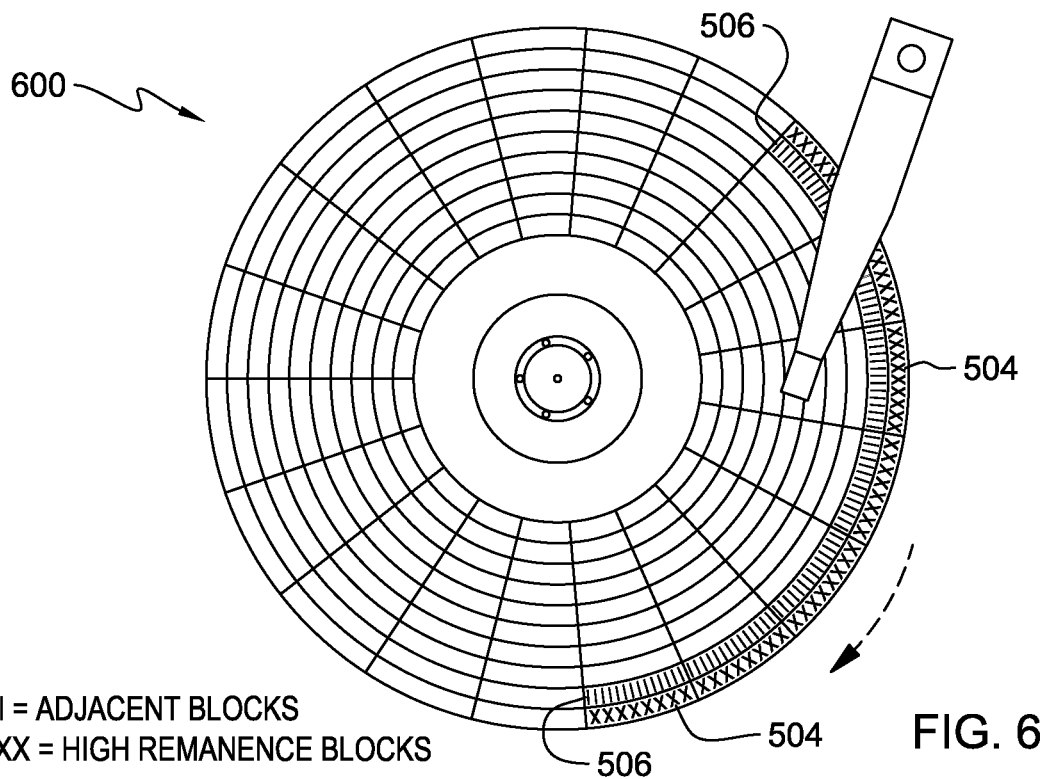
FIG. 6 illustrates a hard disk drive with clustered high remanence blocks in accordance with an embodiment of the invention.

FIG. 6 illustrates a hard disk drive with clustered high remanence blocks in accordance with an embodiment of the invention. Reorganized HDD 600 shows HDD 500 after having placed high remanence blocks 504 together on a single track. High remanence blocks 504 are now clustered on the outer-most track of reorganized HDD 600. This involves relocating the data stored in each block, (i.e. deleting data in one storage block and saving it in another storage block). In this embodiment, adjacent blocks 506 are all on the same, outermost track, which would allow for a re-write of just one track if high remanence blocks 504 are removed. No matter the placement, however, with high remanence blocks 504 on a single track, in no case will there be more than two adjacent tracks in need of re-writing. This large reduction in adjacent track re-writes may lead to less power consumption and less heat production.

In addition, the clustering of storage blocks with substantially similar security levels can take them from across multiple physical storage devices and put them on platform best suited to them. For example, if, out of a multitude of physical storage devices, there were only one or two that contained discrete tracks, in addition to storing the high remanence blocks in contiguous blocks and/or tracks, they could be placed together on the one or two physical devices containing discrete tracks, further reducing the amount of re-writes necessary. Furthermore, as such storage devices would ultimately still write more than storage devices without high remanence blocks, the high remanence data blocks could also be consolidated to storage devices/locations with the most efficient cooling.

Figure 7:
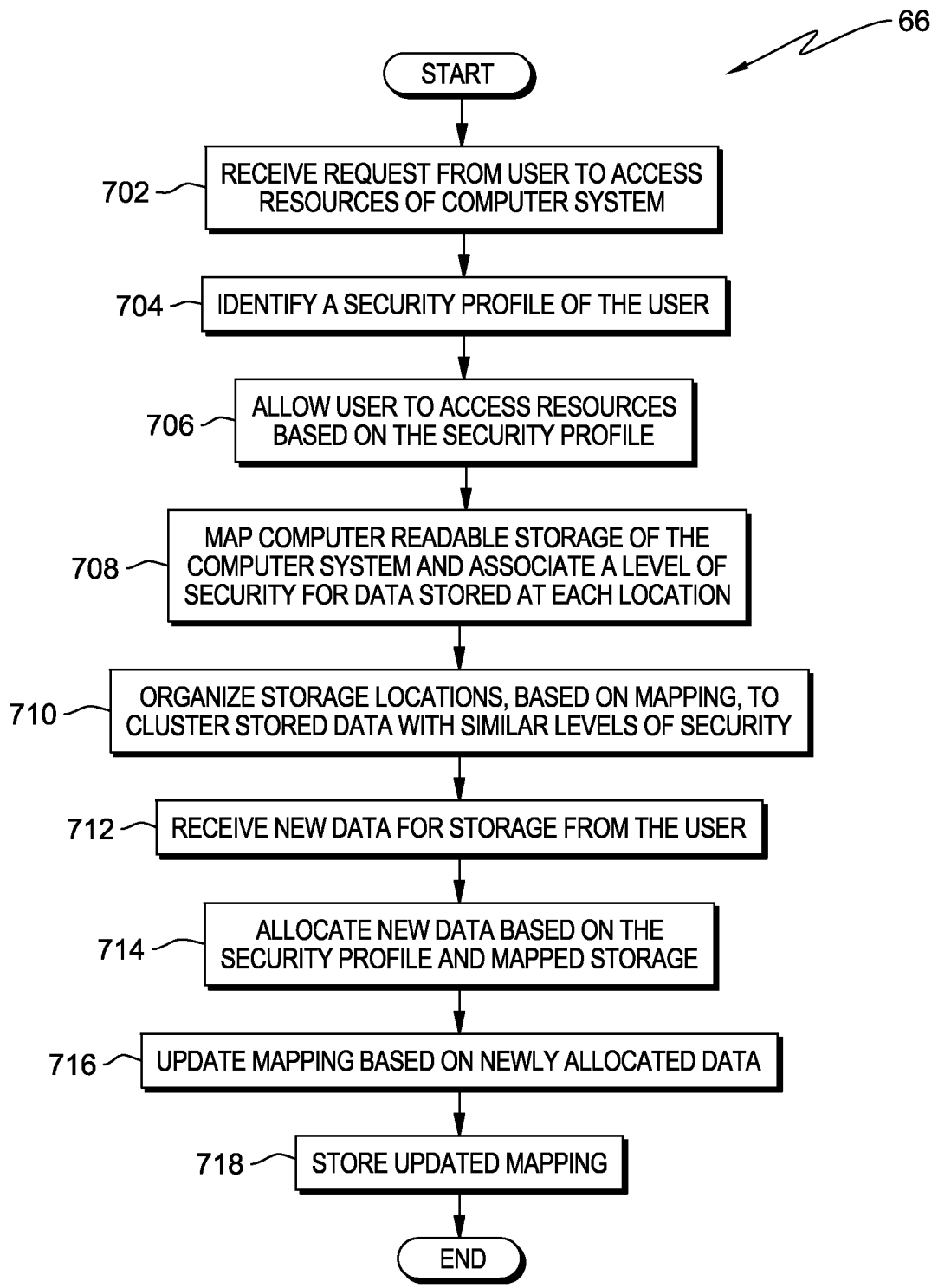
FIG. 7 depicts security compliant data storage management functionality for organizing and allocating data in a computer system in accordance with an illustrative embodiment.

FIG. 7 depicts security compliant data storage management functionality 66 for organizing and allocating data in a computer system in accordance with an illustrative embodiment. For clarity, security compliant data storage management functionality 66 may be referred to as storage management program 66 hereinafter. In a preferred embodiment, storage management program 66 may be a set of instruction running on a management layer of a computer system, such as a cloud computing environment. In another embodiment, storage management program 66 may be a set of instructions running on a computer system composed of an individual computing device.

Storage management program 66 begins by receiving a request from a user to access resources of a computer system (step 702). A user may be an individual or a program representative of a client or entity allowed to access the computer system. The computer system may be one or more stationary computer devices (as in a cloud computing environment), may be a portable computing device, such as a laptop, PDA, Smartphone, or may be a portable computing device acting as an extension/in conjunction with one or more stationary computing devices. The resources of the computer system may include, in a non-exhaustive list, physical storage, one or more networks, one or more databases, one or more applications, and processing functions.

The request from the user may be as simple as selecting an application icon on a screen, or as complex as entering a login ID and password for authentication as part of the request. In either case, the request must be authenticated as coming from a qualified user outside the system or from an allowable application within the computer system.

Before access to the requested resource is allowed, storage management program 66 identifies a security profile of the user (step 704). A security profile may be identified in a multitude of ways. For example, where the computer system is a portable computing device, a security profile for the system may be saved and used for all users of the system. A preferred embodiment would associate a separate security profile with each identity of every possible user. In such an embodiment, the identity of a user may be determined by a login ID or other verifiable information sent from a user's device.

For example, in an IP network utilizing IMS architecture, there may be a centralized control and management server (or servers) that control a subscriber's devices, preferences and features. Such a management server would have access to what is known as the home subscriber service (HSS), which is a database that maintains information on what devices a subscriber (user) has, which ones are registered on the network, how to contact each of them, location of each of them, and even subscriber preferences (such as a security profile). In such a system, the management server could identify the user based on the device used to connect to the system and locate the security profile associated with that user in the HSS.

The security profile of the user may include different security levels to be used for different types of data. Individual security levels may include remanence standards and compliance polices for various types of data. In a preferred embodiment, these data security standards are based, at least in part, on a geographic location of the user.

As previously discussed different security standards may be applied to different types of data, even within the same region. For example, a medical record might demand a different level of security than a cell phone record. A security profile might identify a number of records of a user, classify each record by a level of security, wherein the level of security assigned to each record of the number of records is derived from security standards of a geographical location associated with those records. Consider a single user travelling internationally. When the user accesses the computer system, the user's security profile might direct storage management program 66 to apply security standards of the user's home country even though the user is currently located in another country. Storage management program 66 may apply different security standards to a second user from a second country.

In another embodiment, a user's security profile might apply different geographical security standards to different groups of data belonging to the same user. For example, a user of the computer system, such as an international business, might have clients from multiple geographic regions. Each client may want or require that their own records be kept in accordance with their own regional standards. The user's security profile might maintain different security standards for each of the user's clients.

In yet another embodiment, a user's security profile has the capability to be affected by the user's current location. For example, if a user's portable device (such as a laptop or cell phone) acted as an extension of a networked computer system, a country or region's laws might require that certain data stored in their region comply with certain security standards. In this embodiment, the user's current location may be received (such as through GPS), and the user's security profile could be updated to reflect the changes of levels of security associated with certain types of data to remain compliant.

In other embodiments, a user may set the user's own preferences and security profile based on the user's own standards, without regard to geographical standards.

Storage management program 66 allows the user to access resources of the computer system with regard to the security profile of the user (step 706).

In a preferred embodiment, storage management program 66 maps tangible computer-readable storage locations within the computer system and associates a level of security for the data stored at each storage location (step 708). Each storage block within the system preferably maintains a level of security for the data stored within it. The mapping of the storage locations shows the placement of data with various levels of security in reference to each other. In another embodiment, where each storage block does not maintain a level of security for the data stored within it, storage management program 66 must analyze every storage block with regard to the security profile of the user whose data is stored within the storage block to determine the level of security. Other embodiments may merely provide a list identifying storage locations and respective security levels for the data stored within each location.

Storage devices comprising the tangible computer-readable storage locations may be traditional HDD, small factor drives, such as with portable computing devices, or a mix of the two.

In one embodiment, the mapping is done using a self-organizing map (SOM). A SOM is a type of artificial neural network useful for visualizing a low-dimensional view of high-dimensional data. The SOM consists of nodes (associated in this case with physical location of storage blocks) and associated with each node is a weight vector. In a preferred embodiment, the weighted vector is indicative of a level of security associated with the physical location of that storage block. The self-organizing map identifies patterns of the level of security associated with storage blocks/locations within the tangible computer-readable storage locations and densities of these storage blocks/locations (how many blocks and or locations of the same level of security are grouped together in physical storage).

In a preferred embodiment, the computer system receives (from storage) an existing map of storage locations which can be verified and/or updated as necessary so that computing power is not wasted on remapping the entire computer system upon every access.

Storage management program 66 organizes the storage locations, based on the mapping, to cluster stored data with substantially similar levels of security (step 710). Clustering includes erasing one or more storage locations containing data of a certain level of security, and re-storing the data next to or in close physical proximity to a storage location with data of a substantially similar level of security (i.e. relocating the stored data). Close physical proximity includes being stored on a single data track, contiguous data tracks, or contiguous storage blocks.

What is meant by "substantially similar" is that the degree to which security standards differ for two different storage blocks is very small. By way of example, if remanence standards dictate that one record should be written over ten times to be properly removed, and another record need only be written over three times, these two records would not be substantially similar. However, a record requiring writing over of ten times versus a record requiring writing over of nine or even eight times, may be considered substantially similar.

Some embodiments may be devoid of step 710 and storage management program 66 may only use the mapping as guide for new data allocation (discussed in step 714). Other embodiments may use step 710 only as necessary. For example, if data is allocated to storage according to the mapping of current storage locations and a security profile (discussed in step 714) from the beginning, reorganization of data in storage may remain unnecessary, however, if changing geographical regions (for example) causes security standards to change for existing data, the mapping of storage may show that the level of security for clustered data may vary significantly, and reorganizing the data may be warranted.

Storage management program 66 receives new data for storage on the computer system from the user (step 712). Where the resource that the user requests access to is physical storage, the computer system will at some point receive data from the user and have to allocate the data among one or more physical storage locations. Based upon both the security profile (which dictates security levels and standards for different types of data) and the mapping of current storage showing the location and densities of data with different levels of security in the storage, storage management program 66 allocates the data (step 714). The new data is allocated to storage blocks and/or tracks contiguous to storage blocks and/or storage locations containing data with substantially similar levels of security.

Based on the allocation of the new data, in a preferred embodiment, storage management program 66 updates the mapped storage (step 716) to include the new levels of security associated with storage blocks containing the new data and storage management program 66 stores the updated mapping (step 718) for use the next time a resource is requested.

The flowchart and block diagrams illustrate the functionality and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While shown and described herein as a solution for organizing and allocating data in storage in compliance with security standard in a networked storage computing environment, it is understood that the invention further provides various alternative embodiments. For example, in one embodiment, the invention provides a computer-readable/useable medium that includes computer program code to enable a computer infrastructure to provide functionality for storage management in a computer system, such as a networked storage computing environment as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider could offer to provide functionality for storing various records in compliance with various security standards contracted for or based on one or more geographic regions in a networked storage computing environment. In this case, the service provider can create, maintain, and support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

As used herein, it is understood that the term "program code" is any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/computer software program, component software or a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for dynamically managing data security of a first and a second plurality of files having first and second security levels, respectively, that include different remanence standards and compliance policies for various types of data, the method comprising the steps of:
   a computer system, responsive to a change in classification of a first file of the first plurality of files from the first security level to the second security level, wherein the first security level corresponds to a first data remanence standard and the second security level corresponds to a second data remanence standard, and wherein a high data remanence data block contains sensitive information which may require multiple re-writes to assure a secure delete;
   identifying current physical storage locations of respective files of the first and second pluralities of files and respective current data remanence standards of security levels for the respective files of the first and second pluralities of files, and
   relocating the first file from a current physical storage location, that was not clustered with the physical storage locations of the files of the second plurality of files, to another physical storage location which is clustered with the physical storage locations of the files of the second plurality of files, and wherein clustering files to consolidate multiple high remanence data blocks into a same physical storage location allows for a reduction in adjacent track re-writes.

2. The method of claim 1, wherein the storage locations are clustered on the same track, contiguous storage blocks, or contiguous tracks.

3. The method of claim 1, wherein the first and second data remanence standards correspond respectively to first and second different types of files having first and second different security policies.

4. The method of claim 1, wherein the change in classification of the first file from the first security level to the second security level is responsive to a request from a user, a change in geographic location of the computer system, a change in geographic location of a device communicating with the computer system, or a change in a security policy for a geographic location of the computer system.

5. The method of claim 1, further comprising the step of determining the cluster of the physical storage locations of the files of the second plurality of files by identifying densities of the physical storage locations of the files of the second plurality.

6. A computer program product comprising one or more computer-readable tangible storage devices and computer-readable program instructions which are stored on the one or more storage devices and when executed by one or more processors of the computer system of claim 1 perform the method of claim 1.

7. A computer system comprising one or more processors, one or more computer-readable memories, one or more computer-readable, tangible storage devices and program instructions which are stored on the one or more storage devices for execution by the one or more processors via the one or more memories and when executed by the one or more processors perform the method of claim 1.

8. A computer program product embodied in one or more computer-readable tangible storage devices and having program instructions stored therein, when executed, to dynamically manage data security of a first and a second plurality of files having first and second security levels respectively, that include different remanence standards and compliance policies for various types of data, the program instructions comprising:

responsive to a change in classification of a file of the first plurality of files from the first security level to the second security level, wherein the first security level corresponds to a first data remanence standard and the second security level corresponds to a second data remanence standard, and wherein a high data remanence data block contains sensitive information which may require multiple re-writes to assure a secure delete, program instructions to:

identify current physical storage locations of respective files of the first and second pluralities of files and respective current data remanence standards of security levels for the respective files of the first and second pluralities of files, and relocate the first file from a current physical storage location, that was not clustered with the physical storage locations of the files of the second plurality of files, to another physical storage location which is clustered with the physical storage locations of the files of the second plurality of files, and wherein clustering files to consolidate multiple high remanence data blocks into a same physical storage location allows for a reduction in adjacent track re-writes.

9. The computer program product of claim 8, wherein the storage locations are clustered on the same track, contiguous storage blocks, or contiguous tracks.

10. The computer program product of claim 8, wherein the first and second data remanence standards correspond respectively to first and second different types of files having first and second different security policies.

11. The computer program product of claim 8, wherein the change in classification of the first file from the first security level to the second security level is responsive to a request from a user, a change in geographic location of the computer system, a change in geographic location of a device communicating with the computer system, or a change in a security policy for a geographic location of the computer system.

12. The computer program product of claim 8, further comprising program instructions, stored on at least one of the one or more storage locations, to determine the cluster of the physical storage locations of the files of the second plurality of files by identifying densities of the physical storage locations of the files of the second plurality.

13. A method for dynamically managing data security of a first and a second plurality of files having first and second data security levels, respectively, that include different remanence standards and compliance policies for various types of data, and an additional file having the first security level, the method comprising the steps of:

a computer system, responsive to receipt of the additional file having the first security level, wherein the first security level corresponds to a first data remanence standard and the second security level corresponds to a second data remanence standard, and wherein a high data remanence data block contains sensitive information which may require multiple re-writes to assure a secure delete;

identifying current physical storage locations of respective files of the first and second pluralities of files and respective current data remanence standards of security levels for respective files of the first and second pluralities of files, files of the first plurality of files being stored in physical storage locations of a first cluster based on the first data remanence standard, and files of the second plurality of files being stored in other physical storage locations in a second cluster based on the second data remanence standard, and storing the additional file in a storage location which is clustered with the first cluster, and wherein clustering files to consolidate multiple high remanence data blocks into a same physical storage location allows for a reduction in adjacent track re-writes.

14. The method of claim 13, wherein the storage locations are clustered on the same track, contiguous storage blocks, or contiguous tracks.

15. The method of claim 13, wherein the first and second data remanence standards correspond respectively to first and second different types of files having first and second different security policies.

16. The method of claim 13, further comprising the steps of:

determining the first cluster of the physical storage locations of the files of the first plurality of files and determining the second cluster of the physical storage locations of the files of the second plurality of files by identifying densities of the physical storage locations of the files of the first and second plurality of files, respectively.

17. A computer system comprising one or more processors, one or more computer-readable memories, one or more computer-readable, tangible storage devices and program instructions which are stored on the one or more storage devices for execution by the one or more processors via the one or more memories and when executed by the one or more processors perform the method of claim 13.

18. A computer program product embodied in one or more computer-readable tangible storage devices and having program instructions stored therein, when executed, to dynamically manage data security of a first and a second plurality of files having first and second security levels, respectively, that include different remanence standards and compliance policies for various types of data, and an additional file having the first security level, the program instructions comprising:

responsive to receipt of the additional file having the first security level, wherein the first security level corresponds to a first data remanence standard and the second security level corresponds to a second data remanence standard, and wherein a high data remanence data block contains sensitive information which may require multiple re-writes to assure a secure delete, program instructions to:

identify current physical storage locations of respective files of the first and second pluralities of files and respective current data remanence standards of security levels for the respective files of the first and second pluralities of files, files of the first plurality of files being stored in physical storage locations of a first cluster based on the first data remanence standard, and files of the second plurality of files being stored in other physical storage locations in a second cluster based on the second data remanence standard, and store the additional file in a storage location which is clustered with the first cluster, and wherein clustering files to consolidate multiple high remanence data blocks into a same physical storage location allows for a reduction in adjacent track re-writes.

19. The computer program product of claim 18, wherein the storage locations are clustered on the same track, contiguous storage blocks, or contiguous tracks.

20. The computer program product of claim 18, wherein the first and second data remanence standards correspond respectively to first and second different types of files having first and second different security policies.

21. The computer program product of claim 18, further comprising program instructions, to:

determine the first cluster of the physical storage locations of the files of the first plurality of files, and determine the second cluster of the physical storage locations of the files of the second plurality of files, by identifying densities of the physical storage locations of the files of the first and second plurality of files, respectively.

* * * * *